United States Patent

Ma et al.

[11] Patent Number: 5,995,500
[45] Date of Patent: Nov. 30, 1999

[54] METHOD AND APPARATUS FOR DIRECT COMMUNICATION BETWEEN MOBILE STATIONS

[75] Inventors: Ming Ma, Täby, Sweden; Donald Joong, Montreal, Canada; Nikos Katinakis, Stockholm, Sweden; Akbar Rahman, Brossard, Canada

[73] Assignee: Telefonaktiebolaget LM Ericsson, Stockholm, Sweden

[21] Appl. No.: 08/896,851

[22] Filed: Jul. 18, 1997

[51] Int. Cl.[6] .............................. H04B 7/212; H04B 7/00
[52] U.S. Cl. ............................................ 370/337; 455/524
[58] Field of Search .................................. 370/277, 280, 370/282, 294, 310, 314, 321, 326, 329, 332, 340, 347, 350, 243; 455/524, 509, 502, 517, 518

[56] References Cited

U.S. PATENT DOCUMENTS

| | | | |
|---|---|---|---|
| 5,423,055 | 6/1995 | Diaz et al. | 455/15 |
| 5,617,412 | 4/1997 | Delprat et al. | 370/281 |
| 5,666,661 | 9/1997 | Grube et al. | 455/509 |
| 5,748,621 | 5/1998 | Masuda et al. | 370/337 |
| 5,771,463 | 6/1998 | Lehmusto et al. | 455/524 |
| 5,822,682 | 10/1998 | Schroderus et al. | 455/63 |
| 5,913,171 | 6/1999 | Solonen et al. | 455/502 |

FOREIGN PATENT DOCUMENTS

| | | | |
|---|---|---|---|
| 0 689 303 | 12/1995 | European Pat. Off. | H04B 7/26 |
| 0 713 345 | 5/1996 | European Pat. Off. | H04Q 7/38 |
| 2 291 564 | 1/1996 | United Kingdom | H04B 7/26 |
| 2 316 271 | 2/1998 | United Kingdom | H04Q 7/38 |
| WO96/025807 | 8/1996 | WIPO | H04B 7/26 |

*Primary Examiner*—Huy D. Vu
*Assistant Examiner*—Chiho Andrew Lee
*Attorney, Agent, or Firm*—Burns, Doane, Swecker & Mathis, L.L.P.

[57] ABSTRACT

In a TDMA/TDD communication system and method, communication throughput is increased by allowing direct duplex communication between the mobile stations that are within close proximity of each other. The system and method determines the range of the mobile stations from each other. Based on the range, the communication units may communicate with each other in one of either direct mode or indirect mode. If an in-range condition is determined, the mobile stations engage in direct duplex communication with each other. Otherwise, they communicate with each other in the indirect mode.

55 Claims, 13 Drawing Sheets

METHOD AND APPARATUS FOR DIRECT COMMUNICATION BETWEEN MOBILE STATIONS

BACKGROUND

This invention generally relates to the field of radio communication systems and, more particularly, to increasing channel allocation efficiency in time division multiple access (TDMA) communication systems that utilize time division duplex (TDD) or frequency division duplex (FDD) access.

A TDMA communication system subdivides one or more radio frequency (RF) channels into a number of time slots during which mobile stations within the system exchanges voice or data and control information with each other. Generally, in these system voice or data information are communicated over time slots known as traffic channels and control information are communicated over time slots known as control channels. Through a plurality of scattered base stations, the mobile stations engage in duplex communication by transmitting bursts of digital information during allocated uplink and downlink time slots. An uplink time slot is a time slot allocated for transmitting the bursts from the mobile station to the base station, and a downlink time slot is a time slot allocated for transmitting the bursts from the base station to the mobile station.

Existing TDMA systems utilize a number of access techniques that support duplex communication. Two well known techniques include frequency division duplex (FDD) access and time division duplex (TDD) access. A TDMA/FDD communication system, such as one based on the Global System for Mobile (GSM) communication standard, uses separate receive and transmit RF channels, which are subdivided into respective uplink and downlink time slots. Another TDMA/FDD system, a digital system known as D-AMPS, which is based on Telecommunication Industry Association (TIA) IS 136 standard. The mobile stations in the GSM system transmit information on the transmit RF channels and receive information on the receive RF channels. The receive RF channel has a fixed frequency offset from the transmit RF channel. Based on allocated RF channels, a local controller in the mobile station determines the receive and transmit RF channels in accordance with the fixed frequency offset.

In contrast, a TDMA/TDD communication system provides duplex communications using a single frequency channel that is divided into a plurality of uplink and downlink time slots. One type of TDMA/TDD communication system is based on the Digital European Cordless Telecommunications (DECT) standard, which defines a protocol that can support high traffic as required for many business applications, such as office environments. Under the DECT each other through a decentralized dynamic channel allocation procedure, which allows various system providers to offer communication services without acquiring specific frequency channel allocation from governmental agencies. Another TDMA/TDD system is the PHS system, which is a DECT like system for the pacific market.

In both the TDD and FDD systems, a geographical area is divided into a number of cells or micro-cells according to a predefined frequency reuse cell pattern. The larger communication cells usually cover areas within which fast moving mobile stations operate, for example, those operating from a moving automobile. The smaller micro-cells cover areas where slow moving mobile stations operate, for example, those operated by subscribers within a small office complex or a building. The base stations, which cover corresponding communication cells or micro-cells, communicate with the mobile stations over the RF channels that are divided into uplink and downlink time slots. In response to call requests to and from the mobile stations, the base stations allocate particular uplink and downlink time slots during which corresponding mobile stations can engage in duplex communication with each other or with terminals of a private or public network, such as a public switched telephone network (PSTN).

Often, a calling mobile station may want to place a call to a called mobile station located in close proximity, for example, in the same communication cell as the calling mobile station. Conventionally, in this situation, the communication system establishes a voice path from each mobile station to the base station. As a result, the communication system must allocate a set of uplink and downlink time slots to each one of the calling and the called mobile stations. For example, in GSM systems, the base station allocates to the calling and the called mobile stations one uplink and one downlink time slots, and in D-AMPS systems, it allocates two uplink and two downlink time slots. Conventionally, to place a call between two mobile stations, an uplink and a downlink channel to the base station is allocated, resulting in the use of four links for handling each intra-cell call. Therefore, when handling intra-cell calls in congested office environments according to the conventional method, communication throughput quickly diminishes as the number of intra-cell calls increases.

One solution to this problem lies in allowing the mobile stations to communicate directly with each other. By communicating directly, the mobile stations use only one half of the time slots compared to indirect communication. Subsequently, one of the mobile stations transmits burst of information over a digital traffic channel, while the other receives them. During a second time slot, the mobile stations transmit and receive messages in an opposite order in time, thereby reducing the number of allocated time slots by half. An Annex to the DECT standard, Annex G, proposes a direct communication mode. The direct mode is activated via a mode switch positioned on the mobile stations. Because the direct mode is activated under the control of the subscribers, consequently, the base stations do not participate in the setting up and handling of the direct calls. There is, therefore, a high probability that the users, who generally have little or no knowledge of channel allocation within the system, would not engage in direct communication in a manner that would improve channel allocation efficiency. Furthermore, direct calls according to the Annex are initiated without any knowledge of the distance between calling and called mobile stations, thereby increasing the chance of an unsuccessful call set-up.

Therefore, channel availability may remain constrained, despite the proposed direct communication capability between the mobile stations.

There are communication systems based on FDD access techniques that allow direct communication between mobile stations. One such system, known as a trunked system, can centrally control direct communication between the mobile stations. There exist both analog and digital trunked systems. In this type of system, a central controller, in response to requests for direct communication, allocates a frequency channel over which the mobile stations can communicate directly with each other in a simplex manner. Generally, direct communication in the trunked system is carried out for providing communication privacy between two communicating parties and not for increasing communication throughput. Furthermore, the mobile stations in such a trunked system communicate using a one way communication path that does not support duplex communication.

Therefore, there exists a need for a TDMA communication system that efficiently allocates duplex channels for direct communication between the mobile stations.

SUMMARY

The present invention that addresses this need is exemplified in a TDMA communication system that allocates TDMA time slots over one or more RF channels for engaging two mobile stations in direct duplex communication based on their position relative to each other. The communication system includes a mobile switching center (MSC) that based on an in-range condition allocates time slots during which the mobile stations communicate with each other in either a direct mode or an indirect mode. In a FDD implementation of the invention, the in-range condition is indicated based on whether the mobile stations are in the same cell or not. If a calling and a called mobile stations are in the same cell, then the MSC allocates the time slots in a way that the mobile stations can communicate directly with each other. In a TDD implementation, the in range condition is indicated based on received signal quality of the calling and the called mobile stations. Under this arrangement, the in-range condition is indicated when the received signal strength from the called mobile station at a base station used by the calling mobile station to initiate the call exceeds a threshold. Alternatively, the in-range condition may be indicated when the received signal strength from one of the mobile station at the other mobile station exceeds the threshold.

Preferably, the MSC, in response to the in-range condition, allocates a first time slot during which the calling mobile station transmits the information to the called mobile station, while the called mobile station receives the transmitted information from the calling mobile station. The MSC allocates a second time slot during which the called mobile station transmits the information to the calling mobile station, while the calling mobile station receives the transmitted messages from the called mobile station. In the present invention, the transmit and receive time slots may be on a single RF channel, e.g., in the TDD implementation, or separate receive and transmit RF channels, e.g. in the FDD implementation.

According to some of the more detailed features of the invention, the mobile stations communicate voice or data information on a traffic channel. They also communicate signaling information on a control channel or a signaling sub-channel. The signaling information may include instructions transmitted from the MSC to the mobile stations. Preferably, the traffic channel includes a signaling sub-channel for transmitting signaling information between the calling and called mobile station during voice or data communication. According to one aspect of the invention, during a call set-up, the MSC designates one of the mobile stations as a master mobile station that transmits instructions to the other mobile station, and the other mobile station as a slave mobile station that receives instructions from the master mobile station and transmits responses thereto. Thereafter, when communicating in direct mode, at least one of the mobile station periodically, e.g., during idle periods, monitors the control channel for receiving signaling information from the MSC.

According to other more detailed features of the invention, the signaling information transmitted on the control channel or the signaling sub-channel relate to service information provided by the communication system. The service information may be a call waiting service information or a text messaging service information. In another aspect of the invention, the service information directed to a slave mobile stations is routed to it through the master mobile station. Also, based on the service information, the MSC may switch the communication mode of the mobile stations from direct to indirect mode, or vice versa. For example, if the signaling information communicated over the sub-channel relate to a received signal strength received at one of the mobile stations from the other mobile station, the MSC switches the communication mode of the mobile stations from direct to indirect mode.

According to still other aspects of the invention, a method for providing duplex communication between two mobile stations divides one or more RF channels into a plurality of slots during which information are communicated. The method places the mobile stations in direct mode during which the mobile stations engage in direct duplex communication. While communicating in direct mode, the mobile stations communicate signaling information with each other, for example, over the control sub-channel. The method of the invention switches the communication mode of the mobile communication units from direct mode to indirect mode based on a received signal strength or signaling information communicated between the mobile stations.

Other features and advantages of the present invention will become apparent from the following description of the preferred embodiment, taken in conjunction with the accompanying drawings, which illustrate, by way of example, the principles of the invention.

DETAILED DESCRIPTION

Figure 1:
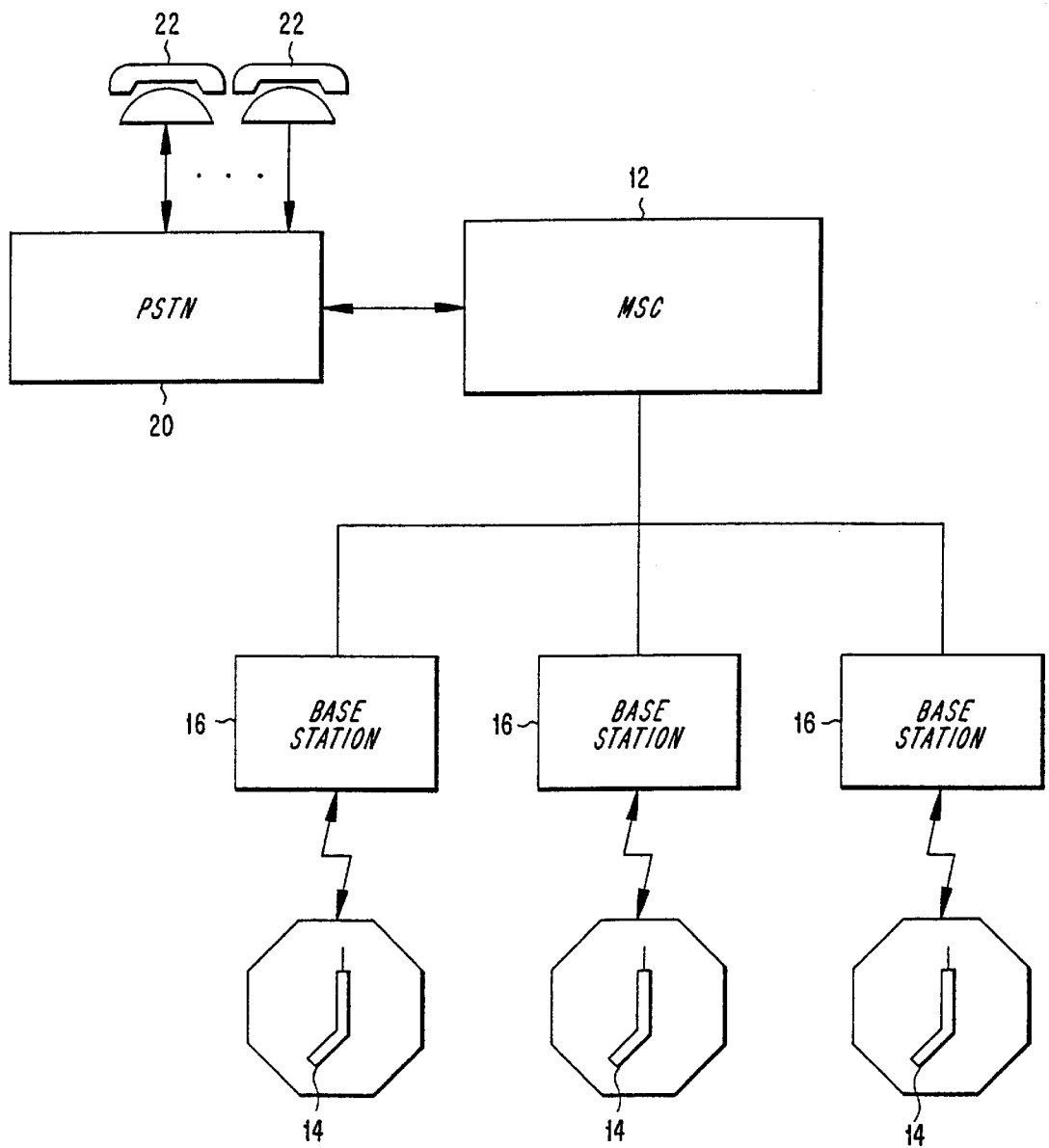
FIG. 1 is a block diagram of a TDMA communication system that advantageously incorporates the present invention.

Referring to FIG. 1, a communication system 10 according to an exemplary embodiment of the present invention includes an MSC 12 that controls and manages calls to or from a number of mobile stations 14 through a number of base stations 16. The mode of operation of the communication system 10 is controlled based on one of a variety of communication protocols. The system of the present invention can be configured according to one of GSM, DECT, D-AMPS, PHS, or any other FDD or TDD standards. The GSM and DECT communication protocols are described fully in European Telecommunications Standard Institute (ETSI) Radio Equipment and Systems (RES) documents. The D-AMPS communication protocol is fully described in telecommunication industry association (TIA) ANSI documents. Therefore, the operation of the system 10 is described herein, to the extent necessary for understanding of the present invention. Although the present invention is described as embodied in a digital cellular system, from the following description it would become apparent the present invention may also be applied to an analog cellular communication system.

The MSC 12 controls various functions of the communication system 10, including controlling telephony switching, etc. The base stations 16, which cover a designated coverage area, are coupled to the MSC 12 through well known interface circuitry and transmission links. The MSC 12 also interfaces with a public switched telephone network (PSTN) 20, to allow wired to wireless call handling between conventional telephones 22 and the mobile stations 14. The PSTN 20 handles calls to or from the conventional telephones 22 via wired connections which couple the PSTN 20 to the base stations 16 through the MSC 12.

Figure 2:
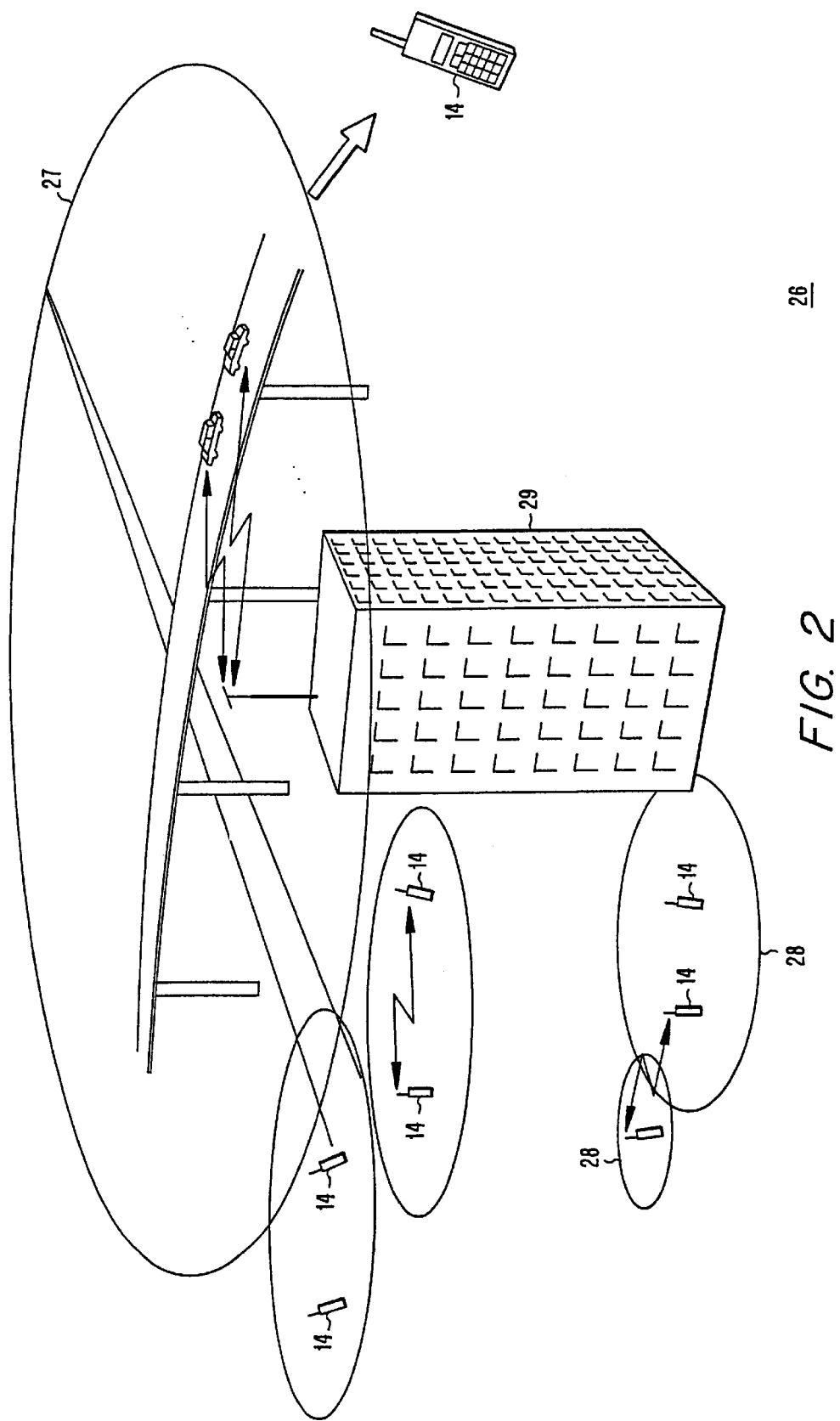
FIG. 2 is a diagram of a service area covered by the communication system of FIG. 1.

With reference to FIG. 2, an exemplary service area 26, such as an office complex, covered by the communication system 10 of the present invention is shown. Each base station 16 (not shown) covers a particular communication cell 27 or micro-cell 28. The communication cells 27 cover areas where fast moving mobile stations 14 operate. The communication micro-cells 28 cover areas where slow moving mobile stations 14 operate. Additionally, the service area 27 may include pico-cells (not shown) covering smaller areas such as various floors within a building 29. The base stations 16 communicate with the mobile stations 14 within a respective communication cell 27 or micro-cell 28 over one or a pair of RF channels that are divided into time frames during which information are communicated in a duplex manner.

Figure 3A:
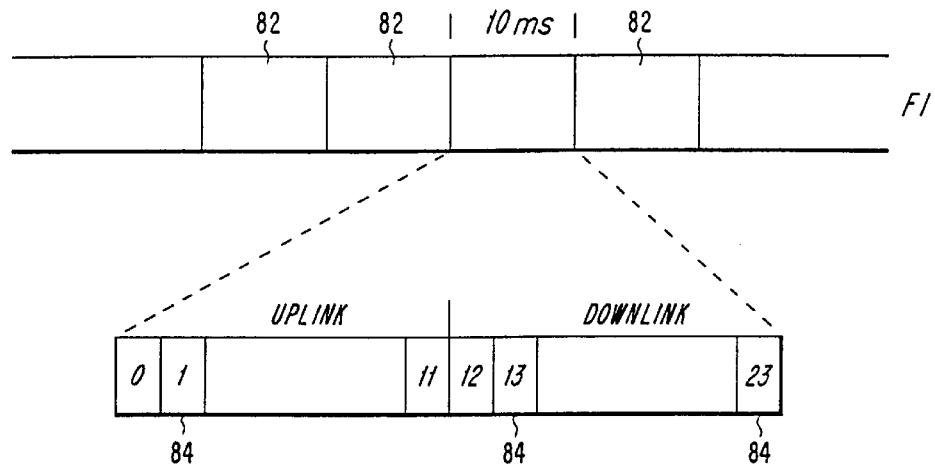
FIG. 3(a) is a diagram of an RF channel divided according to a TDD implementation of the present invention.

FIG. 3(a) shows a TDD frequency channel F1, such as a DECT RF channel, divided into TDD specific time frames 82. In accordance with DECT protocol, the mobile station 14 carries out a dynamic channel allocation from a pool of about 120 available channels, which are provided on ten radio frequency channels. Each time frame 82 has a 10 ms duration, which is subdivided into 24 (from 0 to 23) time slots 84 of approximately 417 micro seconds. The DECT protocol designates time slots 0–11 for uplink communication and time slots 12–23 for downlink communication. Under this arrangement, for each RF channel, a maximum of 12 mobile stations 14 can simultaneously engage in duplex communication with a base station 16. Under such duplex communication, the transmission of information from the base station takes place during downlink time slots and the reception of information from mobile stations 14 takes place during uplink time slots.

Figure 3B:
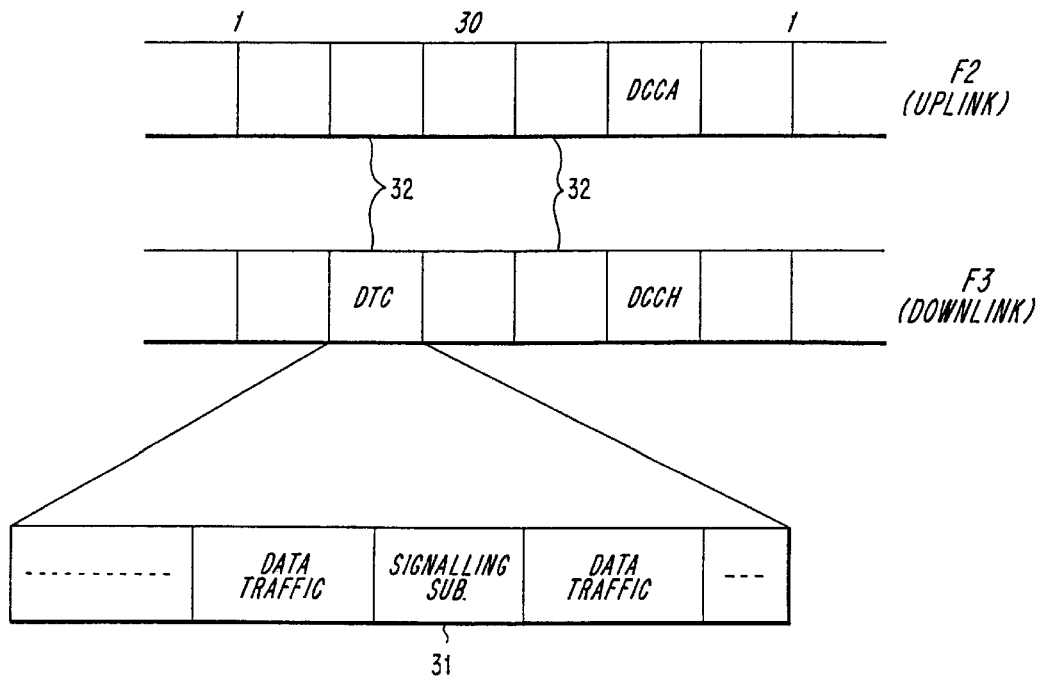
FIG. 3(b) is a diagram of RF channels divided according to a FDD implementation of the present invention.

FIG. 3(b) shows FDD RF channels F2 and F3 (uplink and downlink) divided into repetitive time frames 30 during which information are transmitted. Each frame is further divided into time slots 32. The voice or data information is transmitted during time slots designated as digital traffic channels (DTC). The signaling information, which is used for controlling the system operation, is transmitted during time slots allocated as digital control channels (DCCH).

Before the call set-up in both FDD and FDD systems, all signaling functions pertaining to call management in the system, including initiations, hand overs, and termination, are handled via control information transmitted over the control channel. Once a call is setup, then the signaling information, such as hand over and call termination are communicated over signaling sub-channels, which are multiplexed on the traffic channels during voice or data communication.

When roaming through the service area, a mobile station 14 attempts to establish communication with a base station 16 over the RF channels. Usually, the mobile station 14 selects an RF channel that provides the strongest received signal strength. Thereafter, the mobile station 14 and the base station 16 communicate with each other over the selected RF channel. Once communication is established, the MSC 12, which is aware of all allocations within the cells 27 and 28, allocates uplink and downlink time slots to the mobile station 14. The MSC allocates the channels by transmitting channel allocation signaling information to the mobile stations over a downlink control channel. During the allocated time slots, the mobile station 14 transmits and receives uplink and downlink bursts. The digital bursts include digital data corresponding to voice/data or control information that are transmitted during traffic channels or control channels, respectively. The mobile station 14 is also equipped to hand off an ongoing call, when traveling from one cell to another. By continuous monitoring of the received signal strength measured at the mobile station 14, the MSC 12 sets up the mobile stations 14 to hand off a call when necessary using hand-off signaling information communicated over the signaling sub-channel on the traffic channel.

Referring back to FIG. 1, when a caller, calling from the telephone 22, wishes to reach a particular mobile station 14, the caller places a call through the PSTN 20, which directs the call to the MSC 12. Using a downlink control channel, the MSC 16 instructs all the base stations 16 to page the called subscriber unit 14. When the called mobile station 14 responds to the page, the base station 16 receiving the response over an uplink control channel connects the mobile station 14 to the telephone 22 through the MSC 12 and the PSTN 20. When a caller calling from a mobile station 14 wants to place a telephone call, the mobile station 14 generates a call request over an uplink control channel to the base station 16. Once the request is granted, the MSC 12 routes the call to the PSTN 20. When a caller using a mobile station 14 wishes to generate a call to another mobile station 14, the MSC 12 sets up the call by again paging the called mobile station through the base stations 16. If the MSC 12 determines that the called mobile station 14 is outside the communication range of the calling unit, the call is handled normally according to conventional call handling techniques. If, however, the MSC 12 determines that the calling and the called mobile stations are within a range that allows direct communication there between, the call is handled between the mobile stations according to the present invention.

According to the present invention, the MSC 12 determines whether the called and calling mobile stations 14 are within a direct communication range from each other, i.e., whether they are in-range. If in-range, the MSC 12 allocates a first and second time slots that enables the calling and called mobile stations to engage in direct duplex communication. Otherwise, the call is handled in an indirect mode through the base stations 16. As described later in detail, the MSC 12 determines the mobile stations are in-range if both are located in the same cell for FDD systems. Alternatively, the in-range determination may be made based on the received signal strength at a base station 16 or at a mobile station 14 for TDD systems, wherein the mobile stations could be in different cells.

As described later in detail, the base station 16 and the mobile station 14 include received signal strength indicator (RSSI) circuits, which measure the received signal for determining whether the calling and called mobile stations are in-range or out-of-range from each other. For example, the in-range condition before call set-up may be indicated based on received signal strength from a called mobile station at a base station that is nearest to a calling mobile station. Alternatively, the paging information may indicate that the called and calling mobile stations are in the same cell. Based on the paging information, the mobile stations can be set in direct communication mode. In one embodiment of the invention, before a call set up, the MSC 12 compares the RSSI signal at the base station to a threshold to determine whether the mobile stations are in-range or out-of-range from each other. If the comparison indicates an in-range condition, the MSC 12 allocates a first time slot during which the calling mobile station transmits messages to the called mobile station, while the called mobile station receives the messages transmitted from the calling mobile station. The MSC 12 also allocates a second time slot during which the called mobile station transmits messages to the calling mobile station, while the calling mobile station receives the messages transmitted from the called mobile station. Because the MSC 12 allocates only two time slots for carrying out a duplex communication between the mobile stations 14, the present invention, when compared to conventional methods, reduces the number of allocated time slots in half. Accordingly, instead of four time slots allocated under the conventional method, the communication system 10 of the present invention only allocates two time slots per time frame, which substantially increases communication throughput in heavily congested environments.

After call set up, a TDD system determines the in-range condition during a call based on the received signal strength at the mobile stations 14. That is, each mobile station 14 monitors the received signal strength of the other for determining whether the in-range condition is still valid or not. The in-range condition may be determined by comparing the received signal strength at the mobile stations 14 to a predetermined threshold. If the received signal strength at one of the mobile stations 14 is below the threshold, then the mobile stations 14 revert to indirect communication mode. On the other hand, because of the existence of a communication link between the base station 16 and the mobile stations 14 during an ongoing call, the determination of an in-range condition may be made by the MSC 12 based on the information from the base station 14 and communicated to the mobile stations 14. For example, the base station 14 may monitor the received signal strength at the mobile stations 14 to determine whether in-range condition exists during a call or not.

Figure 4:
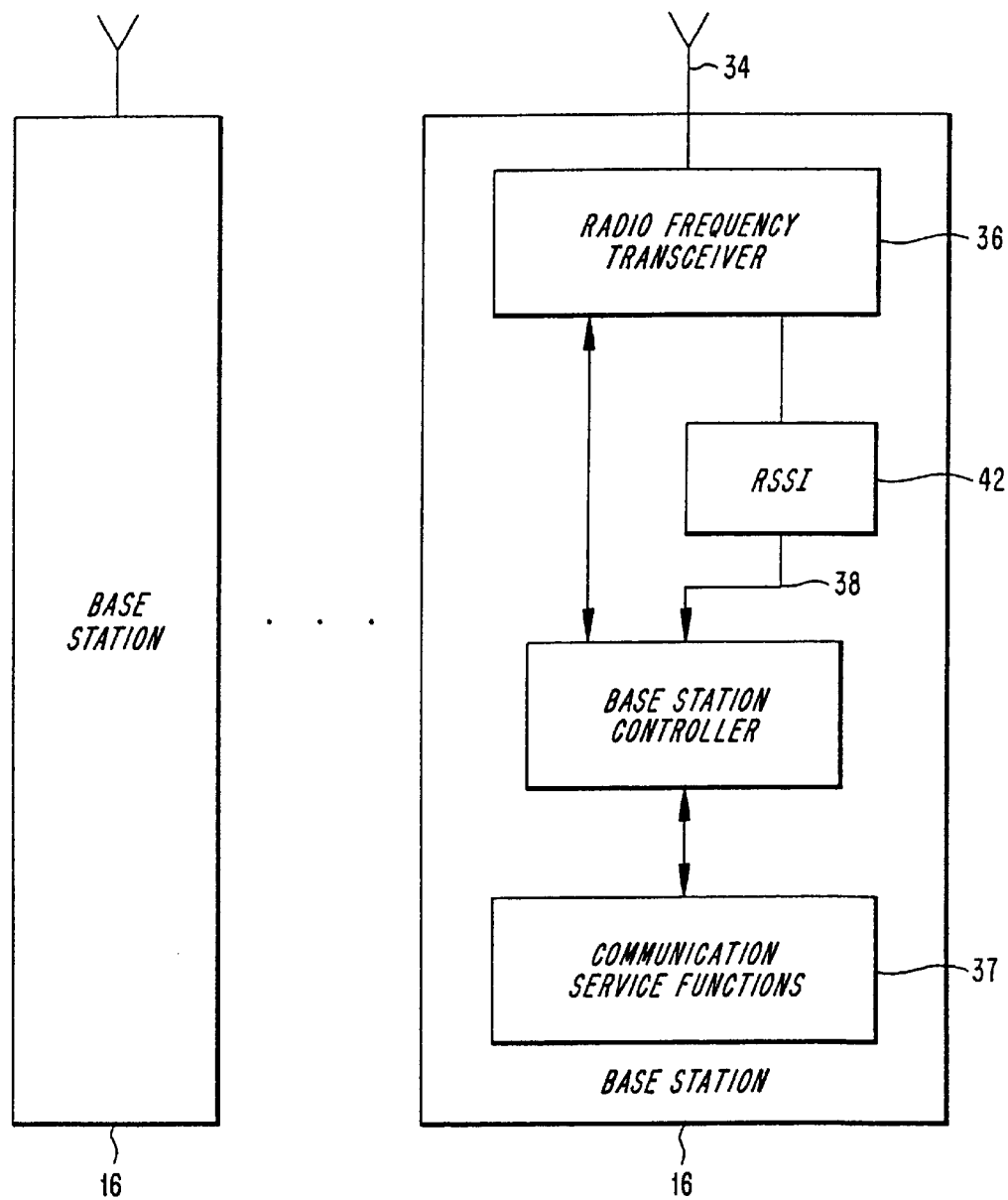
FIG. 4 is a block diagram of a base station included in the communication system of FIG. 1.

With reference to FIG. 4, block diagrams of the base station 16 in accordance with the present invention are shown. RF communication with the base station 16 is provided by an antenna 34 and a conventional RF transceiver block 36. The RF transceiver block 36 is coupled to a base station controller 40, which among other things performs call handling functions over the RF channel. The controller 40, in accordance with the present invention, receives call requests, transmits time slot allocation information received from the MSC 12 to the mobile stations 14, and maintains the RF communication channel until the call is terminated. The controller 40 also controls the operation of the base station 12 for all operations, including setting the RF channels over which the transceiver block 36 communicates with the mobile stations 14. An RSSI block 42 provides an RSSI signal on line 38 to the controller 40. The RSSI signal corresponds to the strength of signal received from a mobile station 14 over an RF channel allocated for wireless communication between the base station 16 and the mobile station 14. A communication service function block 37 handles interconnection for various offered communication services, such as SMS and call waiting.

As described above, the RSSI signal is used by the MSC 12 or the mobile stations 14 to determine whether the calling and the called mobile stations 14 are in-range or out-of-range from each other. To determine whether the mobile stations are in-range or out-of-range, the RSSI signal is compared to a threshold. Preferably, the threshold against which the RSSI signal is compared is selected such that RSSI signals exceeding the threshold would indicate an in-range condition and those below the threshold would indicate an out-of-range condition. It may be appreciated by one of ordinary skill in the art, instead of received signal strength, a signal representing the bit error rate may be used for performing functions that are based on received signal strength. In the present invention, the RSSI signal also allows the MSC 12 or the mobile stations 14 to determine whether a direct communication between the mobile stations has been terminated or not.

Figure 5:
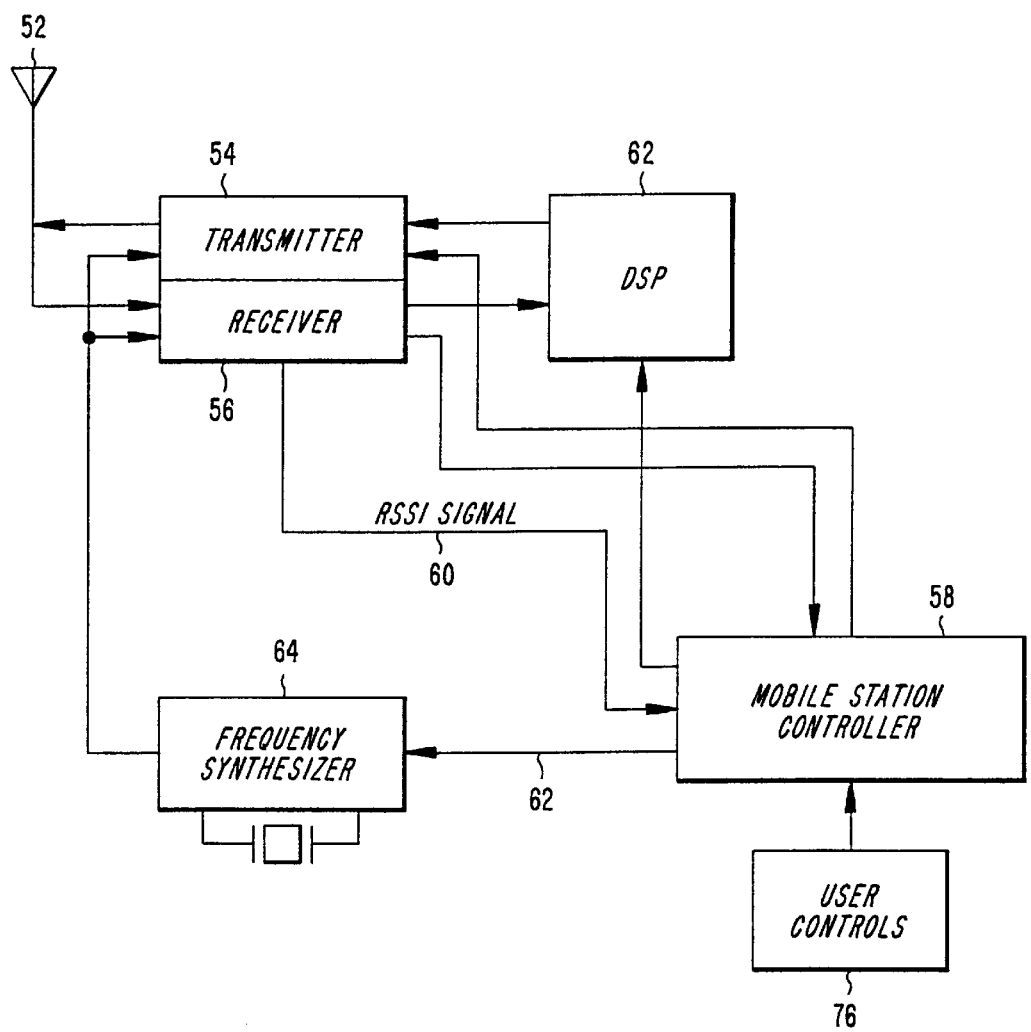
FIG. 5 is a block diagram of a mobile station used in the communication system of FIG. 1.

With reference to FIG. 5, the block diagram of a mobile station 14 is shown to include an antenna 52 coupled to a transmitter circuit 54 and a receiver circuit 56. A mobile station controller 58 receives a signal from the receiver circuit 52 indicating the received signal strength and generates an RSSI signal on line 60. In order to set up the RF channels, the controller 58 provides a signal, on line 62, to a frequency synthesizer 64 for controlling its operation. The frequency synthesizer 64 supplies the operating frequency information to the transmitter 54 and the receiver 56 for providing receive and transmit RF channels. As described before, the RSSI signal at the mobile station 14 is used for selecting a frequency channel that provides the best communication quality at the receiver circuit 56. A digital signal processor (DSP) block 62 digitally process the signal provided to the transmitter 54 and received from the receiver 56. The operation of the DSP 62 for a particular duplexing technique is well known. In TDMA/TDD systems, such as DECT systems, the DSP 62 is programmed in a well known manner to provide time division duplex communication over a single RF channel. Under the TDMA/TDD system implementation, the present invention provides direct communication over receive and transmit time slots on a single RF channel. In TDMA/FDD systems, such as the GSM or D-AMPS systems, the DSP 62 is programmed to provide TDMA communication over separate transmit and receive RF channels. In this way, receive time slots for direct communication according to the present invention are on receive RF channels, and transmit time slots are on transmit RF channels.

Figure 6:
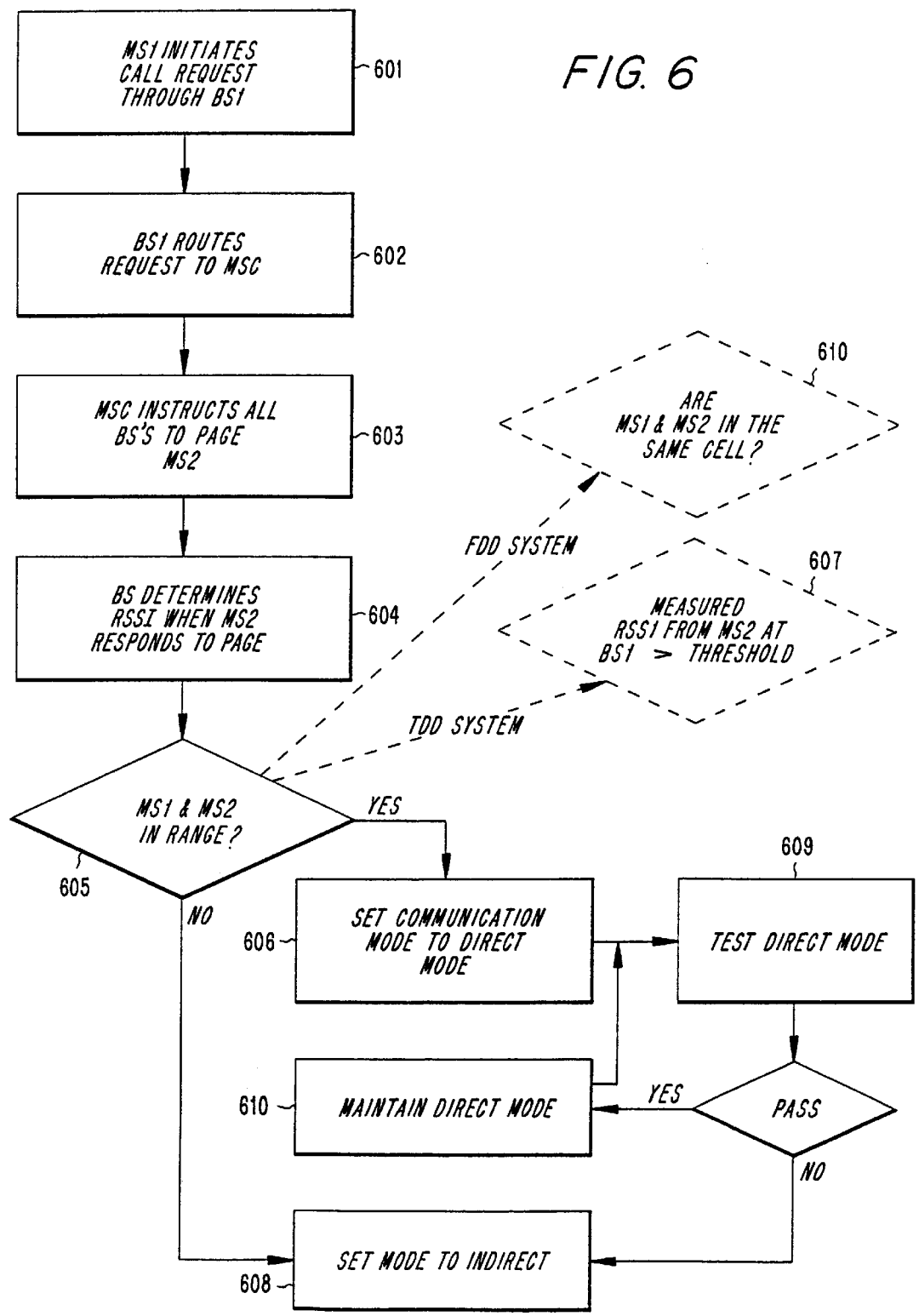
FIG. 6 is a flow chart of the steps for setting up a call based on an in-range condition in accordance with the present invention.

Referring to FIG. 6, a flow chart of a method for providing duplex communication according to the present invention is shown. Assuming that a calling mobile station (MS1) wishes to call a called mobile station (MS2), MS1 transmits a call request over an allocated control channel to a first base station (BS1) which is in communication with MS1, block 601. The BS1 routes the call request to the MSC 12, block 602. The MSC 12 instructs all of the base stations 16 to page the called mobile station MS2, block 603. Once MS2 responds to the page, the MSC 12 receives RSSI information via a base station receiving the response, block 604. Then, a determination is made as to whether MS1 and MS2 are in-range, block 605. In the FDD implementation of the invention, the in-range determination is made based on whether MS1 and MS2 are in the same communication cell or not, block 610. The determination of whether the mobile stations are in the same cell or not may be based on one or a combination of factors, including received signal strength of the mobile stations at the base station. If the MSC 12 determines that MS1 and MS2 are in the same cell, the communication mode between the MS1 and MS2 is set to direct mode. Alternatively, the determination may be based on whether the same base station receives the page response as the one receiving the call request.

In the TDD implementation of the invention, the in-range determination is made based on the received signal strength from MS2 at the BS1, block 607. Preferably, the MSC determines that the in-range condition is satisfied when the received signal strength from MS2 as measured by the first base station BS1 is greater than a threshold. It would be appreciated that the received signal threshold for determining whether mobile stations are in range under the TDD implementation may be different from the received signal threshold for determining whether the mobile stations are in the same communication cell under the FDD implementation. If in range, the MSC 12 sets the communication mode of the MS1 and MS2 to direct mode, block 606. Otherwise, the MSC 12 sets the communication mode into indirect mode, block 608.

As described before, the MSC 12 sets the communication mode to direct mode by allocation a first time slot during which voice or data information is transmitted by MS1 and received by MS2. The MSC 12 also allocates a second time slot during which voice or data information is transmitted from the MS2 and received by MS1. In this way, MS1 and MS2 can engage in direct duplex voice or data communication with each other.

Once the communication mode is set to the direct mode, the MSC 12 continuously performs a direct mode test as to determine whether direct communication between MS1 and MS2 should be maintained or not, block 609. In the FDD implementation, the direct mode test comprises the step of determining whether MS1 and MS2 are in the same cell or not. In the TDD implementation, the direct mode test comprises the step of determining whether the received signal strength received by MS1 and MS2 is greater or less than the threshold. If the direct mode test passes, the MS1 and MS2 continue communicating in direct mode over the allocated time slots, block 610. Otherwise, the MSC 12 sets the communication mode in indirect mode, when MS1 and MS2 communicate with each other through one or more base stations 16, block 608. As shown in the flow chart of FIG. 6, the process of testing the direct mode continues until MS1 and MS2 move out-of-range, when the communication mode reverts to indirect mode. The call maybe terminated by either one of the mobile stations upon termination. The terminating mobile stations transmits a termination signal to its corresponding base station over the control channel. Alternatively a received signal strength measurement below a threshold at the base station may signal the MSC that the call is terminated.

Figure 7:
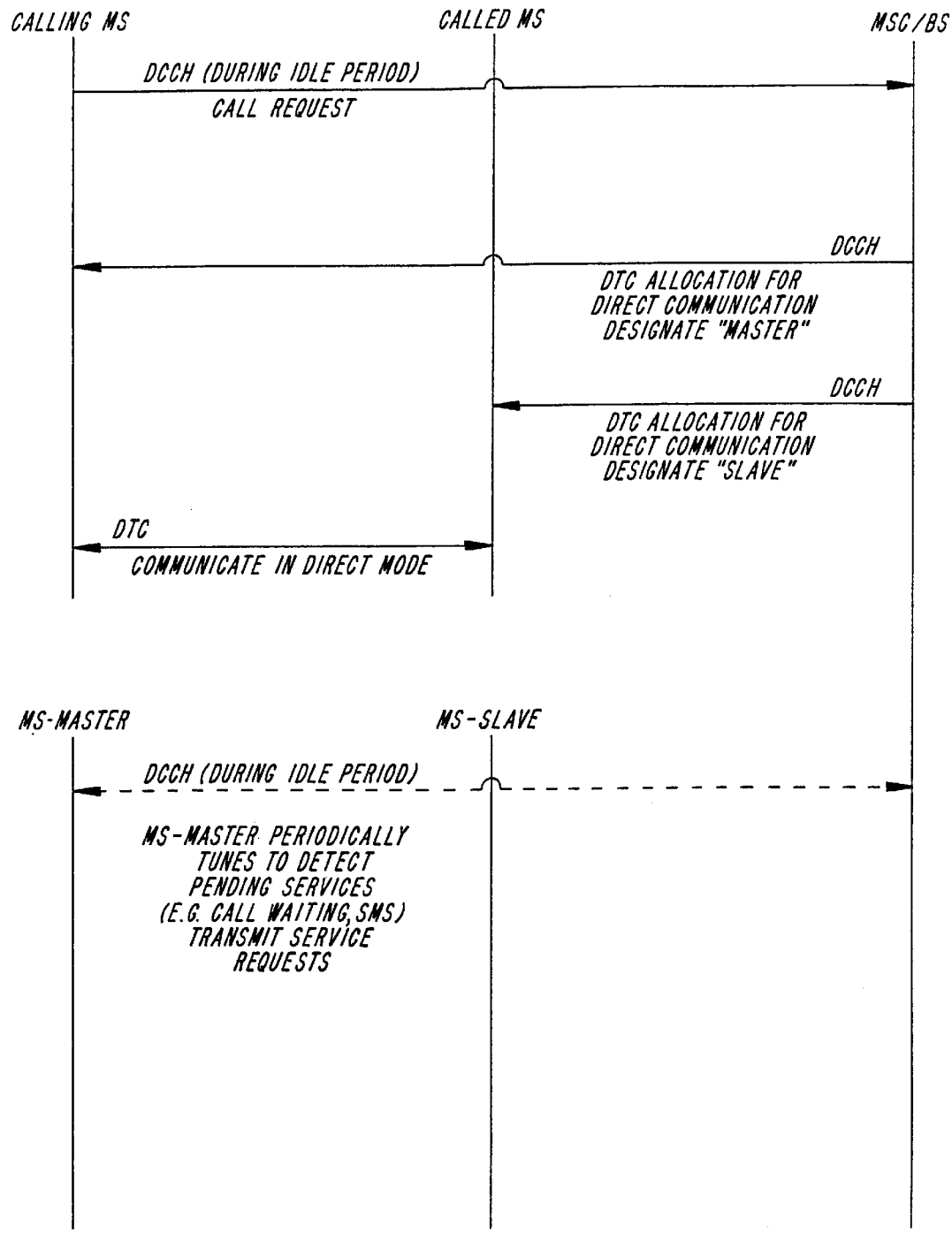
FIG. 7 is a message flow diagram in the communication system of FIG. 1 according to another aspect of the present invention.

Referring to FIG. 7, a message flow diagram of the communication between a calling and a called mobile stations according to another aspect of the present invention is shown. Under this embodiment, the calling mobile station transmits a call request for communication with the called mobile station to the base station 16 over the control channel. The base station 16 routes the call request to the MSC 12, where location information about the mobile stations are maintained. The MSC 12 determines the called mobile station MS2 is in-range or not by determining, for example, whether the MS1 and MS2 are in the same cell. If in-range, the MSC 12 places the calling and the called mobile stations in direct communication mode, by designating traffic channels that enable them to communicate directly with each other. According to this embodiment of the invention, the MSC 12 also designates one of the mobile stations as "master" and the other as "slave". In an exemplary embodiment, the MSC 12 designates the calling mobile station as the "master" mobile station and the called mobile stations as the "slave" mobile station. In direct mode, the mobile stations communicate voice or data information directly over the designated traffic channels without going through the base station. Under this embodiment, during idle periods, when the mobile stations neither receive nor transmit, the master mobile station periodically tunes to the control channel to determine whether an incoming service is pending for either itself or the slave mobile station. Alternatively, during idle periods, the master mobile station could inform the MSC 12 of services requested by either itself or the slave mobile station. A second transceiver in the mobile station that is tuned to the control channel could also be used to monitor service requests even while the mobile station was on an active voice or data period.

Figure 8:
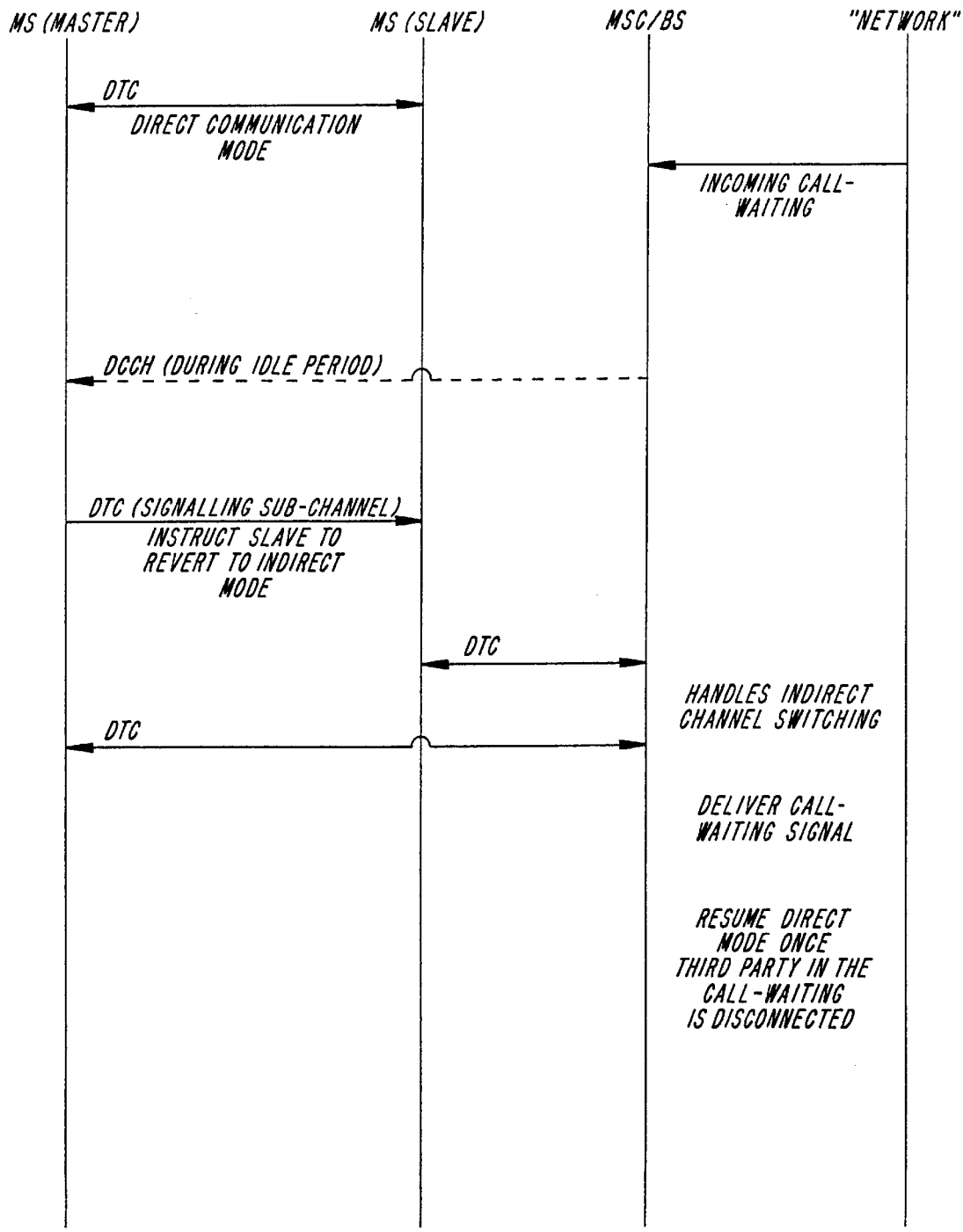
FIG. 8 is a message flow diagram for using a call waiting service of the communication system of FIG. 1.

Under this embodiment, the communication system of the invention allows various communication services to be handled even while the mobile stations are in direct communication with each other. With reference to FIG. 8, there is shown a message diagram for handling a call waiting service according to the present invention. Once a call waiting signal is received from the network, the MSC 12 instructs the mobile stations, which communicate with each other in direct communication mode, to switch to indirect communication mode. The MSC 12 sends the instruction to switch to indirect mode to the master mobile station through the control channel during an idle period. With the instruction, the MSC 12 also sends traffic channel allocation information informing the mobile stations of the traffic channel channels to be used when communicating indirectly. If the call waiting signal is directed to the slave mobile station, the master mobile station instructs the slave mobile station, over the signaling sub-channel to switch to indirect mode using traffic channel allocated by the MSC 12. Thereafter, both of the mobile stations communicate with the MSC 12 over allocated traffic channels in indirect mode through corresponding base station(s). Once indirect communication is established, the MSC 12 delivers the call waiting signal to the slave mobile station. Once the third party in the call waiting has disconnected, then the mobile stations could switch back to direct communication mode according to the steps described in FIG. 7.

Figure 9:
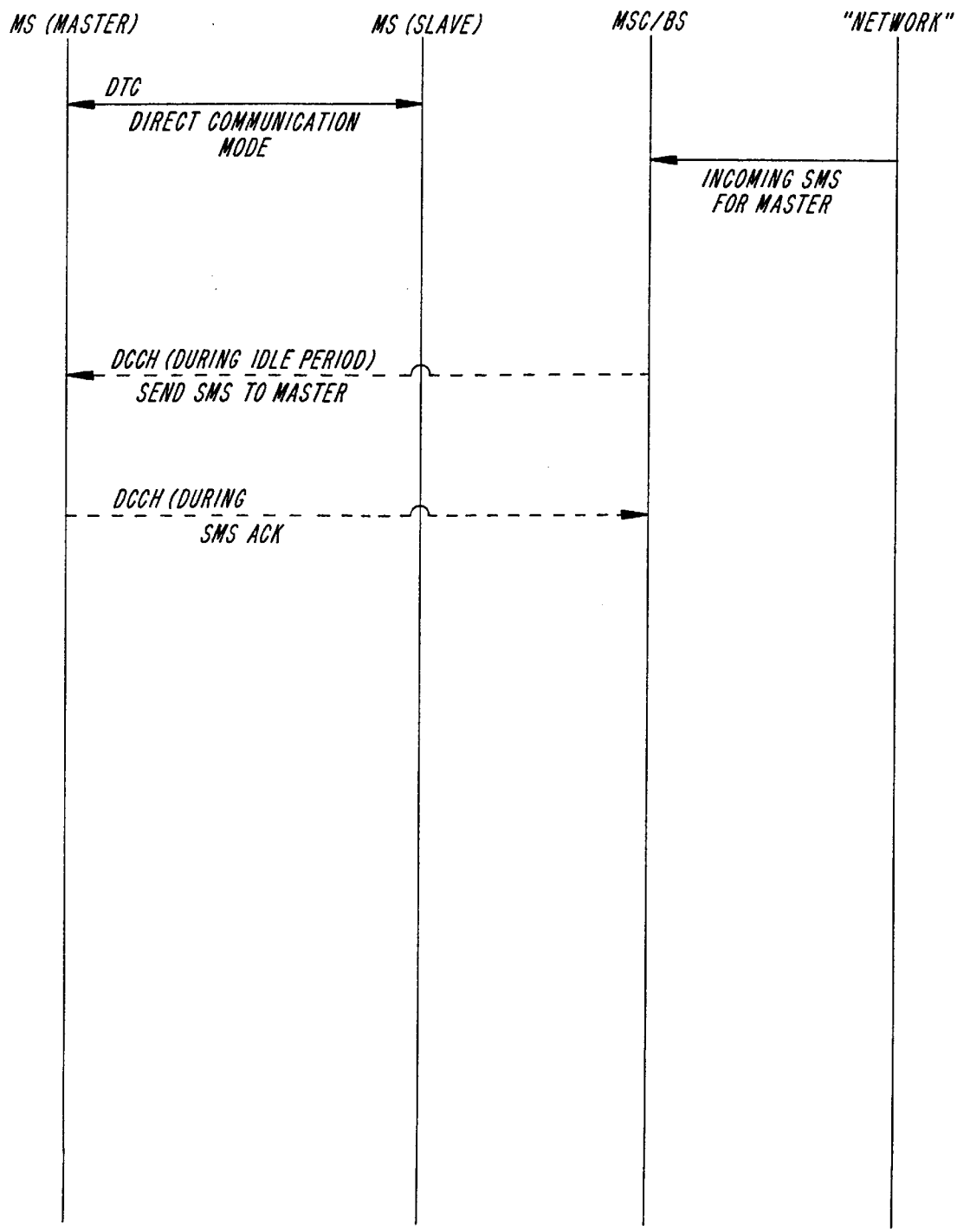
FIG. 9 is a message flow diagram for delivering messages to a slave mobile station.

Another service offered by the communication system 10 is the short message service (SMS). The SMS allows a mobile station to transmit or receive a short character based message. The present invention allows the mobile stations to utilize the SMS even while they are in direct communication with each other. With reference to FIG. 9, a message flow diagram for delivery of SMS messages to a master mobile station that is in direct communication with a slave mobile station is shown. The MSC 12 routes an incoming SMS message for the master mobile station through the control channel during an idle period. Upon receiving the SMS message, the master mobile station sends an acknowledgment to the MSC 12 over the control channel during a subsequent idle period.

Figure 10:
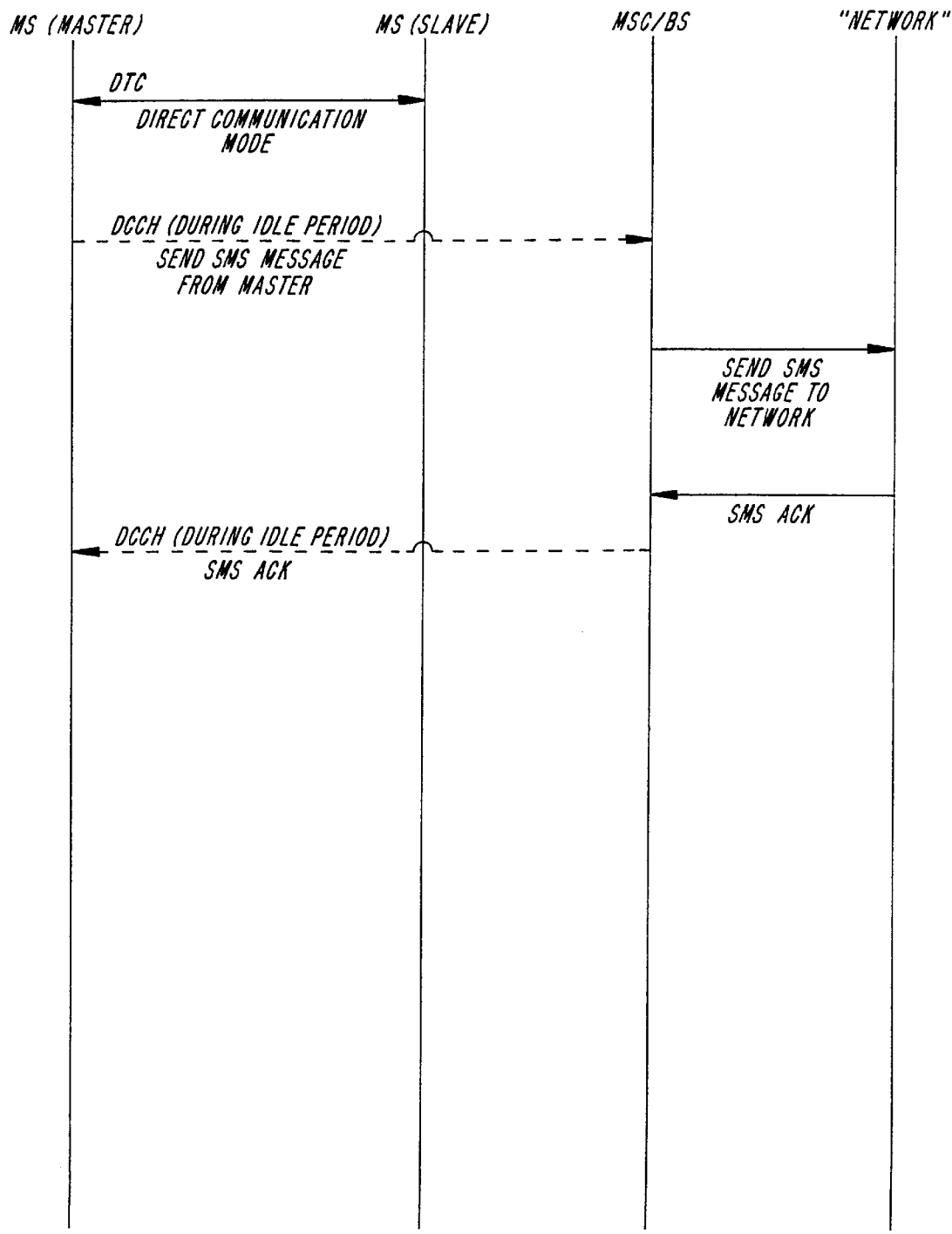
FIG. 10 is a message flow diagram for transmitting SMS message from a master mobile station.

Referring to FIG. 10, a message diagram for transmitting SMS messages from a master mobile station, which is in direct communication with a slave mobile station, is shown. During an idle period, the master mobile station transmits an SMS message to the MSC 12 over the control channel. The MSC 12 transmits the SMS message to the network. Thereafter, the MSC 12 transmits an SMS acknowledgment received form the network to the originating master mobile station over the control channel during an idle period.

Figure 11:
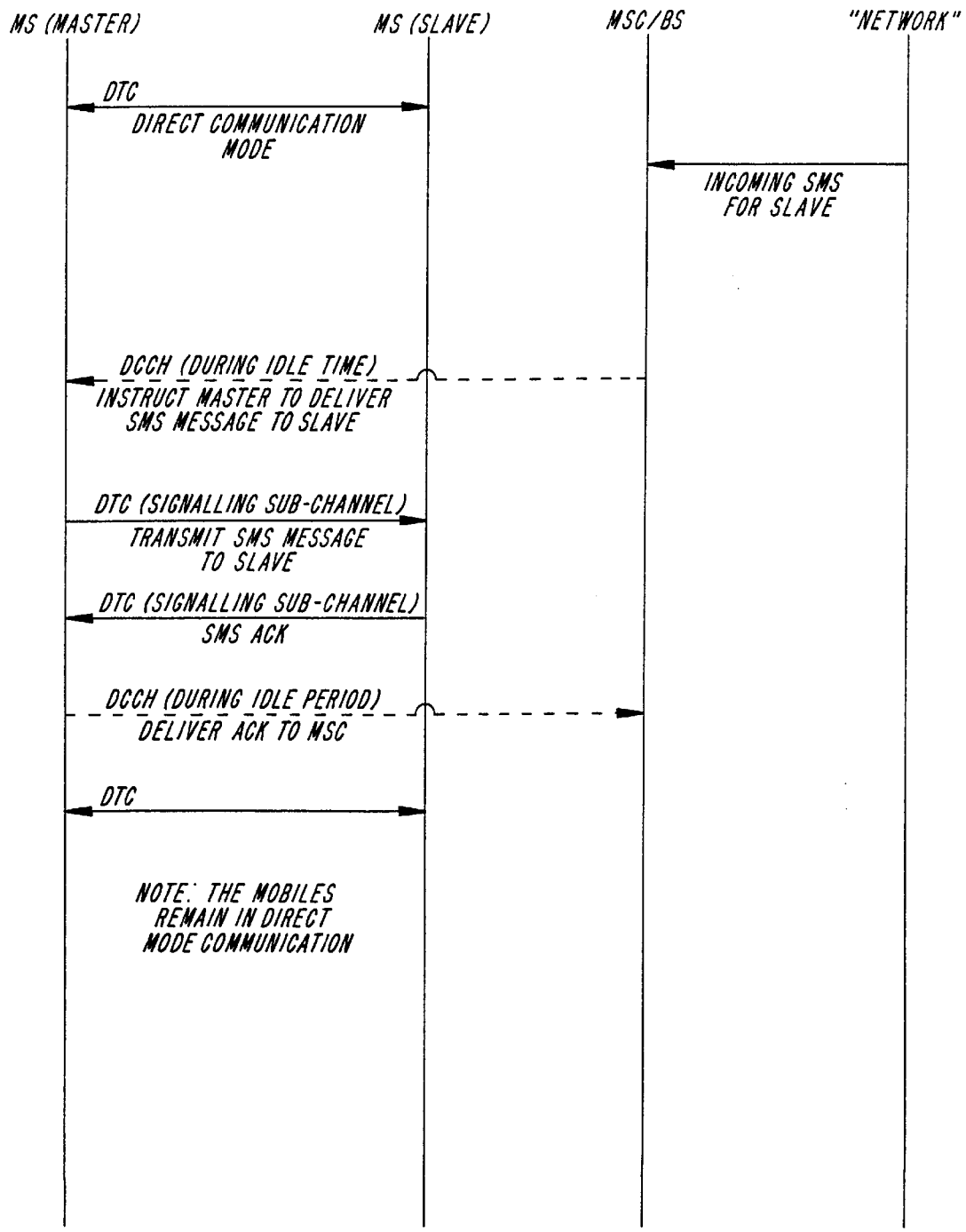
FIG. 11 is a message flow diagram for delivering SMS messages to a slave mobile station.

Referring to FIG. 11, a message diagram for delivering SMS messages to a slave mobile station in direct communication with a master mobile station is shown. According to this message flow diagram, the MSC 12 routes an incoming SMS message for the slave mobile station to the master mobile station over the control channel. The MSC 12 instructs the master mobile station to deliver the transmitted SMS message to the slave mobile station. In response to the instruction, the master mobile station transmits the SMS message to the slave mobile station over the signaling sub-channel. Upon receipt of the SMS message, the slave mobile station transmits an acknowledgment to the master mobile station over the signaling sub-channel. The master mobile station then transmits the acknowledgment received from the slave mobile station to the MSC 12 over the control channel during an idle period. By communicating signaling information over the signaling sub-channel, the master and slave mobile stations can continue to communicate in direct mode over the allocated traffic channels without interruption.

Figure 12:
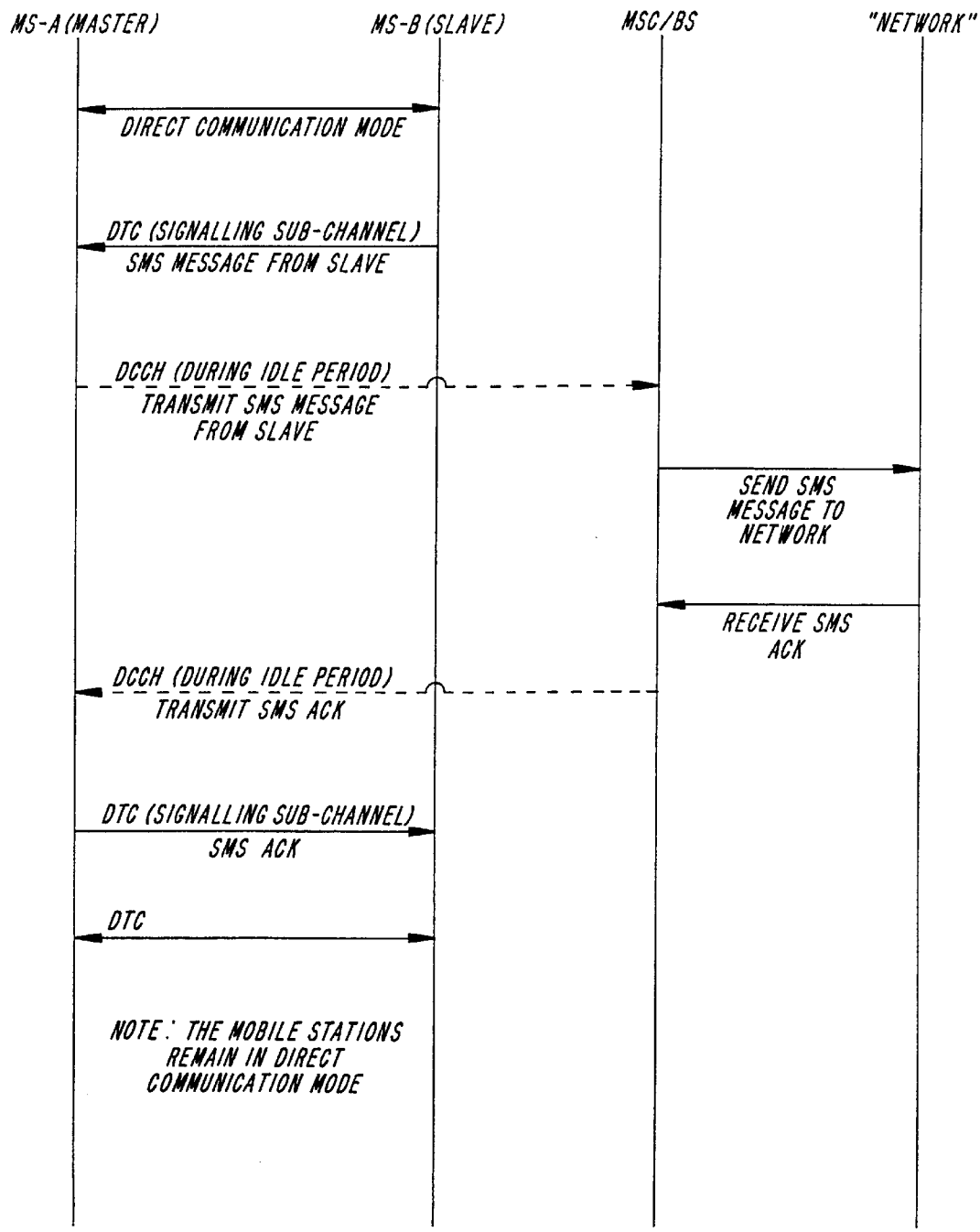
FIG. 12 is a message flow diagram for transmitting SMS messages from a slave mobile station.

Referring to FIG. 12, a message flow diagram for transmitting SMS messages from the slave mobile station is shown. According to FIG. 12, the master and slave mobile stations are in direct communication over allocated traffic channels. The slave mobile station originates an SMS message to be delivered to a third party on the network. The slave mobile station delivers the SMS message to the master mobile station over the signaling sub-channel. During an idle period, the master mobile station transmits the SMS message from the slave mobile station to the MSC 12 over the control channel. The MSC 12 sends the SMS message to the network. Once accepted, the network transmits an acknowledgment for the message to the MSC 12. The MSC 12 then transmits the acknowledgment to the master mobile station over the control channel, instructing the master mobile station to deliver the acknowledgment to the slave mobile station. The master mobile station transmits the acknowledgment to the slave mobile station over the signaling sub-channel. Thereafter, the master and slave stations continue to communicate directly with each other.

Figure 13:
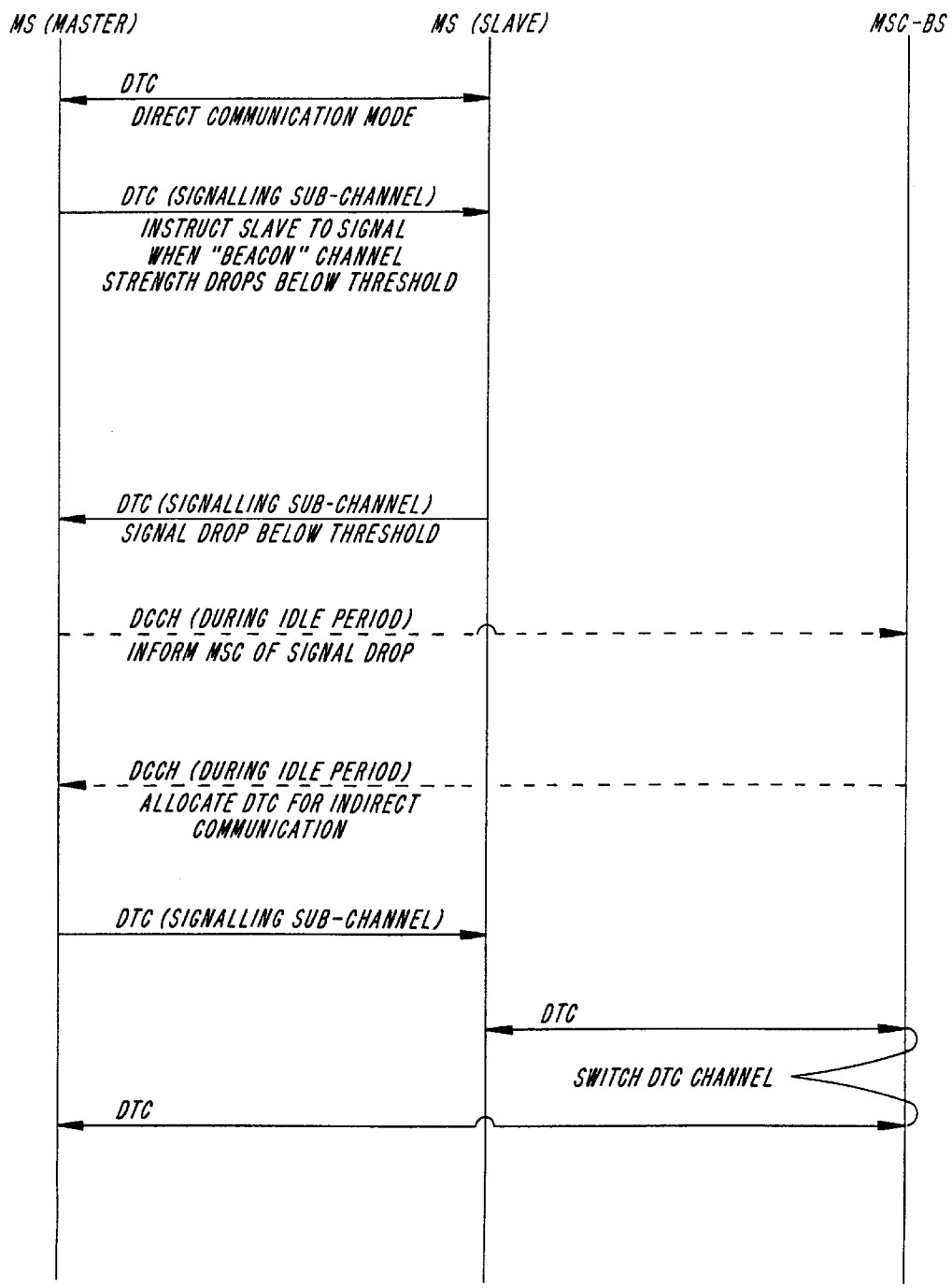
FIG. 13 is a message flow diagram for handling a mobile assigned hand-off.

Referring to FIG. 13, a message flow diagram for handling a mobile assigned hand-off according to another aspect of the present invention is shown. Assuming that master and slave mobile stations are in direct communication with each other, the master mobile station instructs the slave mobile station over the signaling sub-channel to make periodic signal strength measurements on a "beacon" RF channel transmitted by the base station, for example, a control channel. In the preferred embodiment, the beacon RF channel over which signal strength measurements are made is a control channel. The slave mobile station determine whether the received signal strength over the beacon channel is below or above a threshold. Upon detecting an out-of-range condition, the slave mobile station transmits an out-of-range signal to the master base station over the signaling sub-channel. During an idle period, the master mobile station, informs the MSC 12 of the out-of-range condition. The MSC 12 then allocates traffic channel channels to the master and slave mobile stations that would allow them to communicate indirectly with each other through one or more base stations. The MSC 12 instructs the master and slave mobile stations to switch to indirect mode by transmitting information on newly allocated traffic channel to the base station over the control channel. In turn, the master mobile station instructs the slave mobile station to use the newly allocated traffic channel for communicating with the master base station in indirect mode. At that time, both the master and slave mobile stations start using the allocated traffic channels for indirectly communicating with each other through one or more base stations.

Accordingly, the communication system 10 of the present invention includes at least two mobile stations 14 that communicate with each other in one of two modes: a direct mode and an indirect mode. In direct mode, the mobile stations 14 engage in a direct duplex communication with each other on over one or more RF channels. In indirect mode, the mobile stations 14 communicate with each other through the base station 16 according to conventional method. Based on the present invention, the MSC 12, which determines whether the two mobile stations are in-range or out-of-range from each other, sets the mobile stations 14 up for communication in direct mode when an in-range condition is indicated. Otherwise, the MSC 12 sets the mobile stations 14 up for communication in indirect mode, when an out-of-range condition is indicated. In the TDD implementation of the present invention, wherein the in-range condition is indicated based on the received signal quality of the called and the calling mobile stations, the mobile stations can communicate directly with each other even if they are in different cells. This approach does not require any modification to the mobile station's existing architecture and can be easily implemented by simple software modifications in the base station, the mobile station, and MSC. In the FDD implementation, wherein the in-range condition is indicated when the called and the calling mobile stations are in the same cell, the participation of the base station during a call when the mobile stations are engaged in direct communication allows for offering of "smart services", such as the SMS service.

From the foregoing description, it would be appreciated that the communication system according to the present invention substantially increases communication throughput by allowing in-range mobile stations to communicate directly with each other in a duplex manner. In this way, the present invention reduces the number of time slots allocated for duplex communication by one half compared to conventional communication systems. Such increase in communication throughput would allow more calls to go through, especially in heavily congested communication cells. Also, the present invention allows for offering of various communication services, while better utilizing the communication resources.

Although the invention has been described in detail with reference only to the presently preferred embodiment, those skilled in the art will appreciate that various modifications can be made without departing from the invention.

Accordingly, the invention is defined only by the following claims which are intended to embrace all equivalents thereof.

What is claimed is:

1. A communication system that provides duplex communication between mobile stations over at least one RF channel divided into a plurality of time slots during which information are communicated in a duplex manner, comprising:

a calling and a called mobile stations that communicate with each other in one of two communication modes, a direct mode, when the calling and called mobile stations engage in a direct duplex communication with each other, and an indirect mode, when the calling and called mobile stations communicate with each other through at least one base station; and a controller that before a call set up, determines whether the calling and called mobile stations are in-range or out-of-range from each other, wherein the mobile stations communicate in direct mode if they are in-range and communicate in indirect mode if they are out-of-range, wherein the controller, in response to an in-range condition, allocates a first time slot during which the calling mobile station transmits the information to the called mobile station, while the called mobile station receives the transmitted information from the calling mobile station, and a second time slot during which the called mobile station transmits the information to the calling mobile station, while the calling mobile station receives the transmitted messages from the called mobile station, and wherein, when the mobile stations communicate in direct mode, the controller performs a direct mode test to determine whether direct communication between the mobile stations should be maintained or not.

2. The communication system of claim 1, wherein the controller, in response to an in-range condition, allocates a first time slot during which the calling mobile station transmits the information to the called mobile station, while the called mobile station receives the transmitted information from the calling mobile station, and a second time slot during which the called mobile station transmits the information to the calling mobile station, while the calling mobile station receives the transmitted messages from the called mobile station.

3. The communication system of claim 1, wherein the in-range condition is indicated if the called and calling mobile stations are both in one communication cell.

4. The communication system of claim 1, wherein the in-range condition is indicated when the received signal strength from the called mobile station at a base station used by the calling mobile station to initiate a call exceeds a threshold.

5. The communication system of claim 1, wherein the in-range condition is indicated when the received signal strength from one of the mobile station at the other mobile station exceeds a threshold.

6. The communication system of claim 1, wherein the first and second time slots are on a single RF channel.

7. The communication system of claim 1, wherein the first and second time slots are on separate receive and transmit RF channels.

8. The communication system of claim 1, wherein the mobile stations communicate voice or data information on a traffic channel and communicate signaling information on a control channel.

9. The communication system of claim 8, wherein at least one of the mobile stations, when communicating in direct mode, periodically monitors the control channel for receiving signaling information.

10. The communication system of claim 9, wherein the at least one mobile station monitors the control channel during an idle period.

11. The communication system of claim 8, wherein the controller designates one of the mobile stations as a master mobile station for transmitting instructions to the other mobile station, and wherein the controller designates the other mobile station as a slave mobile station for receiving the instructions from the master mobile station.

12. The communication system of claim 8, wherein the signaling information relate to service information provided by the communication system.

13. The communication system of claim 12, wherein the service information is a call waiting signal.

14. The communication system of claim 12, wherein the service information is a text messaging service information.

15. The communication system of claim 12, wherein the service information directed to one of the mobile stations is routed to it through the other mobile station.

16. The communication system of claim 8, wherein the traffic channel include a signaling sub-channel for transmitting signaling information between the calling and called mobile station during voice or data communication.

17. The communication system of claim 16, wherein the signaling information communicated over the sub-channels relate to service information provided by the communication system.

18. The communication system of claim 17, wherein based on the service information, the controller switches the communication mode of the mobile stations from direct to indirect mode.

19. The communication system of claim 16, wherein the signaling information communicated over the sub-channel relate to a received signal strength received at one of the mobile stations from the other mobile station.

20. The communication system of claim 19, wherein based on the received signal strength, the controller switches the communication mode of the mobile stations from direct to indirect mode.

21. A communication system for providing duplex communication between mobile stations over one or more RF channels divided into a plurality of time slots during which information are communicated, comprising:

at least two mobile stations; and a controller for assigning transmit and receive time slots in response to a call request transmitted from a calling mobile stations to communicate with a called mobile station through a base station, wherein the controller is responsive to the range of the called and the calling mobile stations from each other for assigning the transmit and receive time slots to allow the calling and called mobile stations to engage in duplex communication with each other, wherein the controller, in response to an in-range condition determined before a call set up, allocates a first time slot during which the calling mobile station transmits the information to the called mobile station, while the called mobile station receives the transmitted information from the calling mobile station, and a second time slot during which the called mobile station transmits the information to the calling mobile station, while the calling mobile station receives the transmitted messages from the called mobile station, and wherein, when the mobile stations communicate in direct mode, the controller performs a direct mode test to determine whether direct communication between the mobile stations should be maintained or not.

22. The communication system of claim 21, wherein the controller, in response to an in-range condition, allocates a first time slot during which the calling mobile station transmits the information to the called mobile station, while the called mobile station receives the transmitted information from the calling mobile station, and a second time slot during which the called mobile station transmits the information to the calling mobile station, while the calling mobile station receives the transmitted messages from the called mobile station.

23. The communication system of claim 22, wherein the in-range condition is indicated if the called and calling mobile stations are both in one communication cell.

24. The communication system of claim 22, wherein the in-range condition is indicated when the received signal strength from the called mobile station at a base station used by the calling mobile station to initiate a call exceeds a threshold.

25. The communication system of claim 22, wherein the in-range condition is indicated when the received signal strength from one of the mobile station at the other mobile station exceeds a threshold.

26. The communication system of claim 21, wherein the first and second time slots are on a single RF channel.

27. The communication system of claim 21, wherein the first and second time slots are on separate receive and transmit RF channels.

28. The communication system of claim 21, wherein the mobile stations communicate voice or data information during a traffic channel and communicate signaling information during a control channel.

29. The communication system of claim 28, wherein at least one of the mobile stations, when communicating, in direct mode periodically monitors the control channel for receiving signaling information from the controller.

30. The communication system of claim 29, wherein the at least one mobile station monitors the control channel during an idle period.

31. The communication system of claim 28, wherein the controller designates one of the mobile stations as a master mobile station for transmitting instructions to the other mobile station, and wherein the controller designates the other mobile station as a slave mobile station for receiving the instructions from the master mobile station.

32. The communication system of claim 28, wherein the signaling information relate to service information provided by the communication system.

33. The communication system of claim 32, wherein the service information is a call waiting signal.

34. The communication system of claim 32, wherein the service information is a text massaging service information.

35. The communication system of claim 32, wherein the service information directed to a slave mobile stations is routed to it through the master mobile station.

36. The communication system of claim 28, wherein the traffic channel include a signaling sub-channel for transmitting signaling information between the calling and called mobile station during voice or data communication.

37. The communication system of claim 36, wherein the signaling information communicated over the sub-channels relate to service information provided by the communication system.

38. The communication system of claim 37, wherein based on the service information, the controller switches the communication mode of the mobile stations from direct to indirect mode.

39. The communication system of claim 36, wherein the signaling information communicated over the sub-channel relate to a received signal strength received at one of the mobile stations from the other mobile station.

40. The communication system of claim 39, wherein based on the received signal strength, the controller switches the communication mode of the mobile stations from direct to indirect mode.

41. A method for providing duplex communication between two mobile stations over one or more RF channels divided into a plurality of slots during which information are communicated, comprising:

generating a call request from a calling mobile stations to a calling mobile station through a base station;

before setting up the call determining whether the calling and called mobile stations are in range;

if in range, allocating time slots during which the mobile stations engage in a direct duplex communication with each other by allocating a first tine slot during which a calling mobile station transmits the information to a called mobile station, while the called mobile station receives the transmitted information from the calling mobile station, and a second time slot during which the called mobile station transmits the information to the calling mobile station, while the calling mobile station receives the transmitted messages from the called mobile station; and performing a direct mode test when the mobile stations communicate in direct mode to determine whether direct communication between the mobile stations should be maintained or not.

42. The method of claim 41, wherein an in-range condition is determined if the called and calling mobile stations are both in one communication cell.

43. The method of claim 41, wherein an in-range condition is determined when the received signal strength from the called mobile station at the base station exceeds a threshold.

44. The method of claim 41, wherein an in-range condition is determined when the received signal strength from one of the mobile station at the other mobile station exceeds a threshold.

45. The method of claim 41 further including the step of periodically monitoring a control channel for receiving signaling information over a control channel.

46. The method of claim 45, wherein the step of periodically monitoring a control channel takes place channel during idle periods of communication between the mobile stations.

47. The method of claim 45, wherein one of the mobile stations is designated as a master mobile station for transmitting instructions to the other mobile station, and wherein the other mobile station is designated as a slave mobile station for receiving the instructions from the master mobile station.

48. The method of claim 45, wherein the signaling information relate to service information provided by the communication system.

49. The method of claim 48, wherein the service information is a call waiting signal.

50. The method of claim 48, wherein the service information is a text massaging service information.

51. The method of claim 48, wherein the service information directed to the slave mobile station is routed to it through the master mobile station.

52. A method for providing duplex communication between two mobile stations over one or more RF channels divided into a plurality of slots during which information are communicated, comprising:

placing the mobile stations in a direct mode, wherein in direct mode the base mobile stations engage in direct duplex communication with each other;

communicating signaling information between the mobile stations while they engage in direct communication with each other;

switching the communication mode of the mobile communication units from direct mode to indirect mode based on the signaling information communicated between the mobile stations, wherein, in indirect mode, the mobile stations engage in indirect duplex communication with each other through at least one base station, wherein the mobile stations communicate in direct mode by allocating a first time slot during which a calling mobile station transmits the information to a called mobile station, while the called mobile station receives the transmitted information from the calling mobile station, and a second time slot during which the called mobile station transmits the information to the calling mobile station, while the calling mobile station receives the transmitted messages from the called mobile station; and performing a direct mode test when the mobile stations communicate in direct mode to determine whether direct communication between the mobile stations should be maintained or not.

53. The method of claim 52, wherein the signaling information communicated over the sub-channels relate to a received signal strength received at one of the mobile stations from the other mobile station.

54. The method of claim 52, wherein the signaling information communicated over the sub-channel relate to service information provided by the communication system.

55. The method of claim 54, wherein the service information relate to a call waiting signal.

* * * * *